(12) United States Patent
Xu et al.

(10) Patent No.: US 10,736,009 B2
(45) Date of Patent: Aug. 4, 2020

(54) HANDOVER METHOD AND APPARATUS

(71) Applicant: Samsung Electronics Co., Ltd., Gyeonggi-do (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 15/543,954

(22) PCT Filed: Jan. 15, 2016

(86) PCT No.: PCT/KR2016/000450
§ 371 (c)(1),
(2) Date: Jul. 14, 2017

(87) PCT Pub. No.: WO2016/114623
PCT Pub. Date: Jul. 21, 2016

(65) Prior Publication Data
US 2018/0014237 A1 Jan. 11, 2018

(30) Foreign Application Priority Data
Jan. 16, 2015 (CN) .......................... 2015 1 0024425

(51) Int. Cl.
*H04W 36/26* (2009.01)
*H04W 76/10* (2018.01)
(Continued)

(52) U.S. Cl.
CPC ....... *H04W 36/26* (2013.01); *H04W 36/0055* (2013.01); *H04W 36/08* (2013.01);
(Continued)

(58) Field of Classification Search
CPC ..... H04W 36/26; H04W 76/15; H04W 36/08; H04W 74/004; H04W 36/0055;
(Continued)

(56) References Cited

U.S. PATENT DOCUMENTS

2013/0165124 A1* 6/2013 Liang ................ H04W 36/0061
455/437
2015/0055620 A1* 2/2015 Vesterinen ............ H04W 36/18
370/331

(Continued)

FOREIGN PATENT DOCUMENTS

| KR | 20140118681 A | 10/2014 |
|---|---|---|
| WO | 2014129783 A1 | 8/2014 |
| WO | 2014148874 A1 | 9/2014 |

OTHER PUBLICATIONS

European Patent Office, "Communication pursuant to Article 94(3) EPC," Application No. EP 16737587.2, dated Jun. 29, 2018, 9 pages.

(Continued)

*Primary Examiner* — Will W Lin

(57) ABSTRACT

The present application discloses handover methods and apparatuses. One specific embodiment of the handover method comprises receiving a handover request message from a source base station by a target base station; determining whether to add a secondary base station for setting up a dual-connectivity for a user equipment (UE) according to the handover request message; and performing a handover operation and a dual-connectivity setup operation in response to the determination of adding the secondary base station. The dual-connectivity can be set up for the UE during the handover in the embodiments.

19 Claims, 6 Drawing Sheets

(51) Int. Cl.
*H04W 36/08* (2009.01)
*H04W 76/15* (2018.01)
*H04W 76/27* (2018.01)
*H04W 36/00* (2009.01)
*H04W 74/00* (2009.01)
*H04W 36/30* (2009.01)

(52) U.S. Cl.
CPC ......... *H04W 74/004* (2013.01); *H04W 76/10* (2018.02); *H04W 76/15* (2018.02); *H04W 76/27* (2018.02); *H04W 36/0069* (2018.08); *H04W 36/30* (2013.01)

(58) Field of Classification Search
CPC . H04W 76/27; H04W 76/10; H04W 36/0069; H04W 36/30
See application file for complete search history.

(56) References Cited

U.S. PATENT DOCUMENTS

| | | | |
|---|---|---|---|
| 2016/0007255 A1* | 1/2016 | Sharma | H04W 36/08 370/331 |
| 2016/0057660 A1 | 2/2016 | Hong et al. | |
| 2016/0150458 A1* | 5/2016 | Wang | H04W 36/0072 370/331 |
| 2016/0286449 A1 | 9/2016 | Choi et al. | |
| 2016/0337924 A1* | 11/2016 | Ohta | H04L 5/00 |
| 2017/0019821 A1* | 1/2017 | Zhang | H04W 36/0055 |
| 2017/0134998 A1* | 5/2017 | Xu | H04W 36/08 |
| 2017/0181044 A1* | 6/2017 | Wen | H04W 36/0005 |
| 2017/0188278 A1* | 6/2017 | Ohta | H04W 36/0033 |
| 2017/0195953 A1* | 7/2017 | Amorim de Faria Cardote | H04L 67/12 |
| 2017/0245181 A1* | 8/2017 | Zhang | H04W 12/04 |
| 2017/0374591 A1* | 12/2017 | Xu | H04W 36/08 |
| 2018/0014237 A1* | 1/2018 | Xu | H04W 36/08 |

OTHER PUBLICATIONS

Fujitsu, "Scenarios and prioritizations for dual connectivity," R3-140093, 3GPP TSG-RAN WG3 Meeting #83, Prague, Czech Republic, Feb. 10-14, 2013, 5 pages.

3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 251 pages.

NSN et al., "SeNB Change and Inter-MeNB Handover Procedure", 3GPP TSG-RAN WG3 Meeting #83, R3-140424, Prague, Czech Republic, Feb. 10-14, 2014, 8 pages.

Kyocera, "Handover Enhancements with Dual Connectivity", 3GPP TSG-RAN WG2 #85, R2-140698, Prague, Czech Republic, Feb. 10-14, 2014, 8 pages.

Extended European Search Report, dated Nov. 21, 2017, regarding Application No. 16737587.2, 12 pages.

Huawei, "MeNB Mobility Procedure", 3GPP TSG-RAN WG3 Meeting #83, R3-140117, Feb. 2014, 5 pages.

Ericsson, "Dual connectivity—mobility scenarios", 3GPP TSG-RAN WG3 Meeting #83, R3-140346, Feb. 2014, 1 pages.

Broadcom Corporation, "MCG handover for Dual Connectivity", 3GPP TSG-RAN WG2 Meeting #85, R2-140531, Feb. 2014, 8 pages.

* cited by examiner

[Fig. 1]
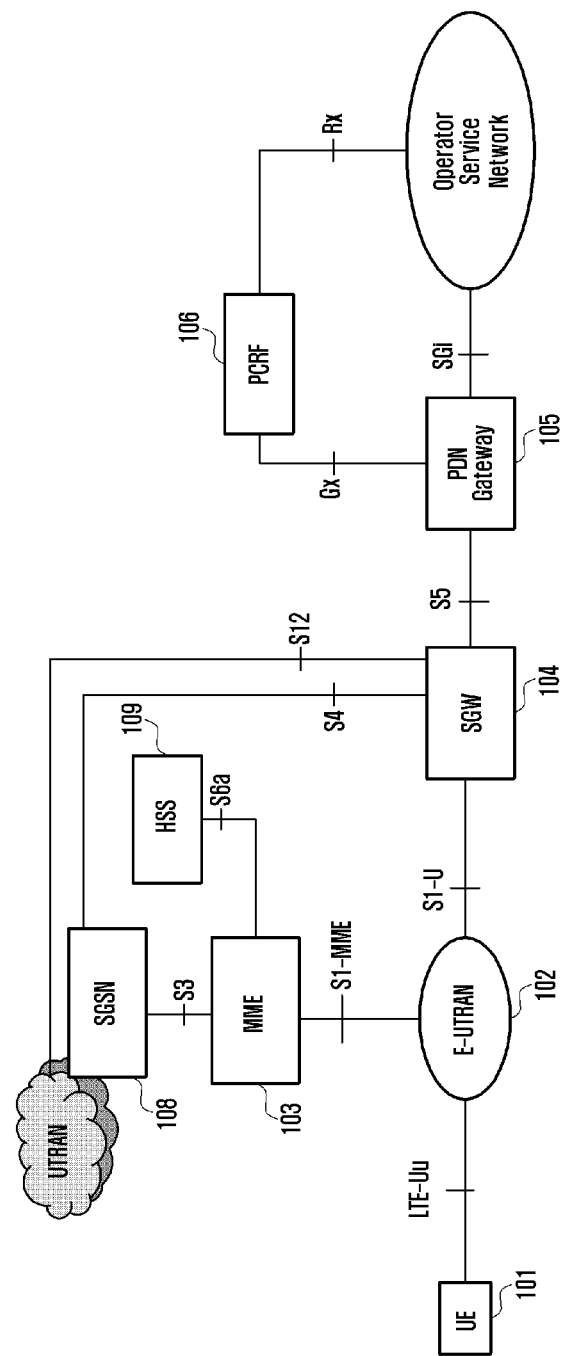

[Fig. 2]
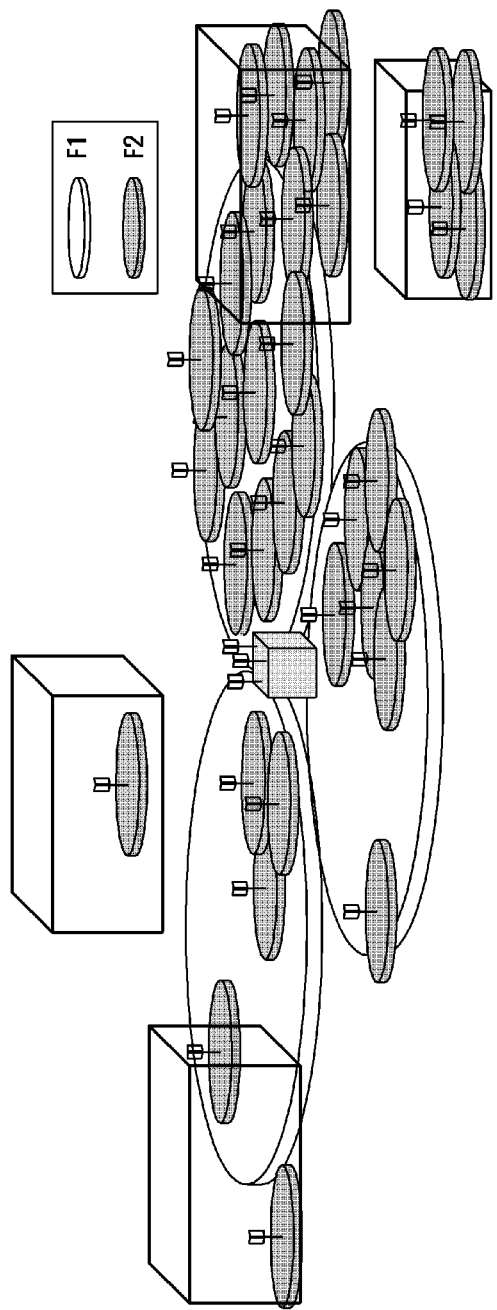

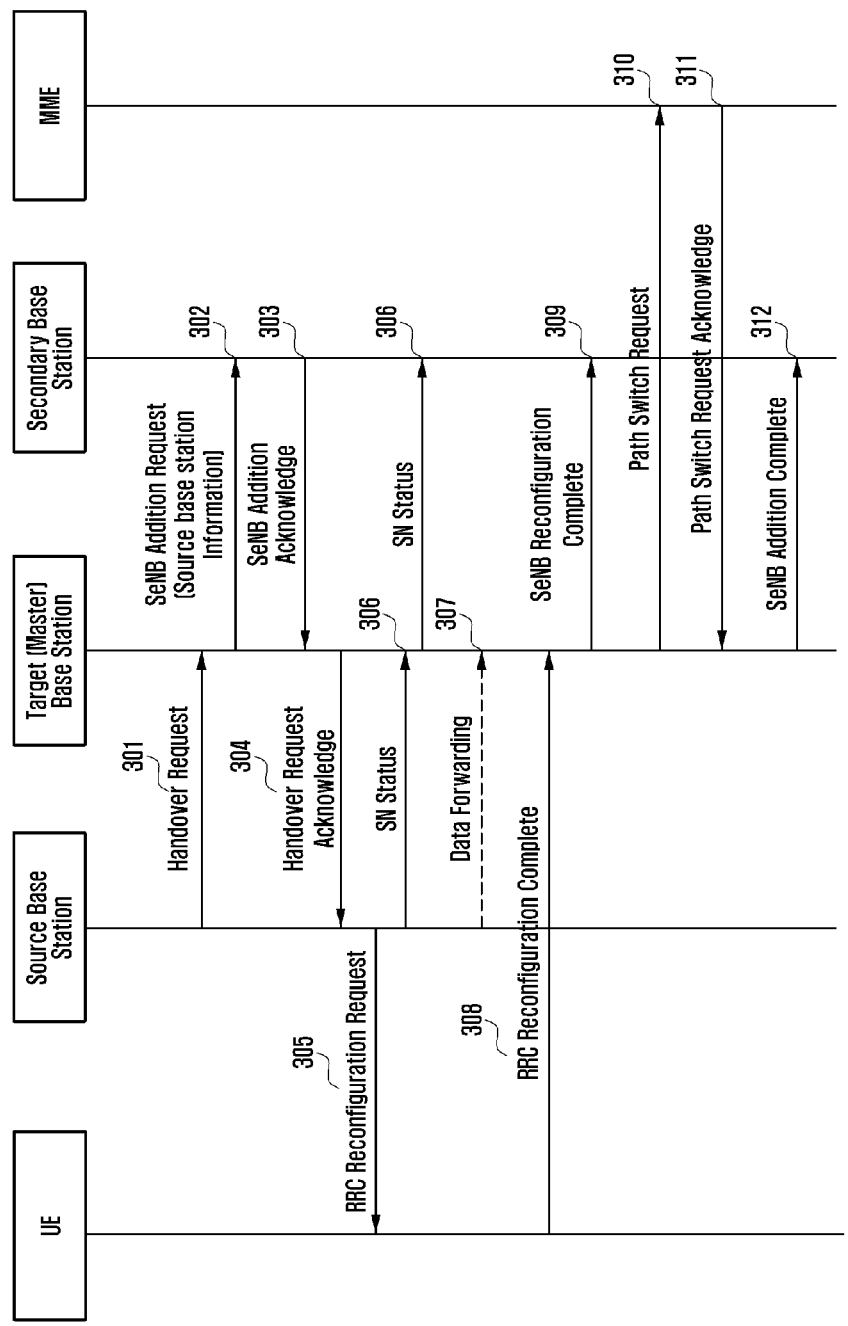
[Fig. 3]

[Fig. 4]
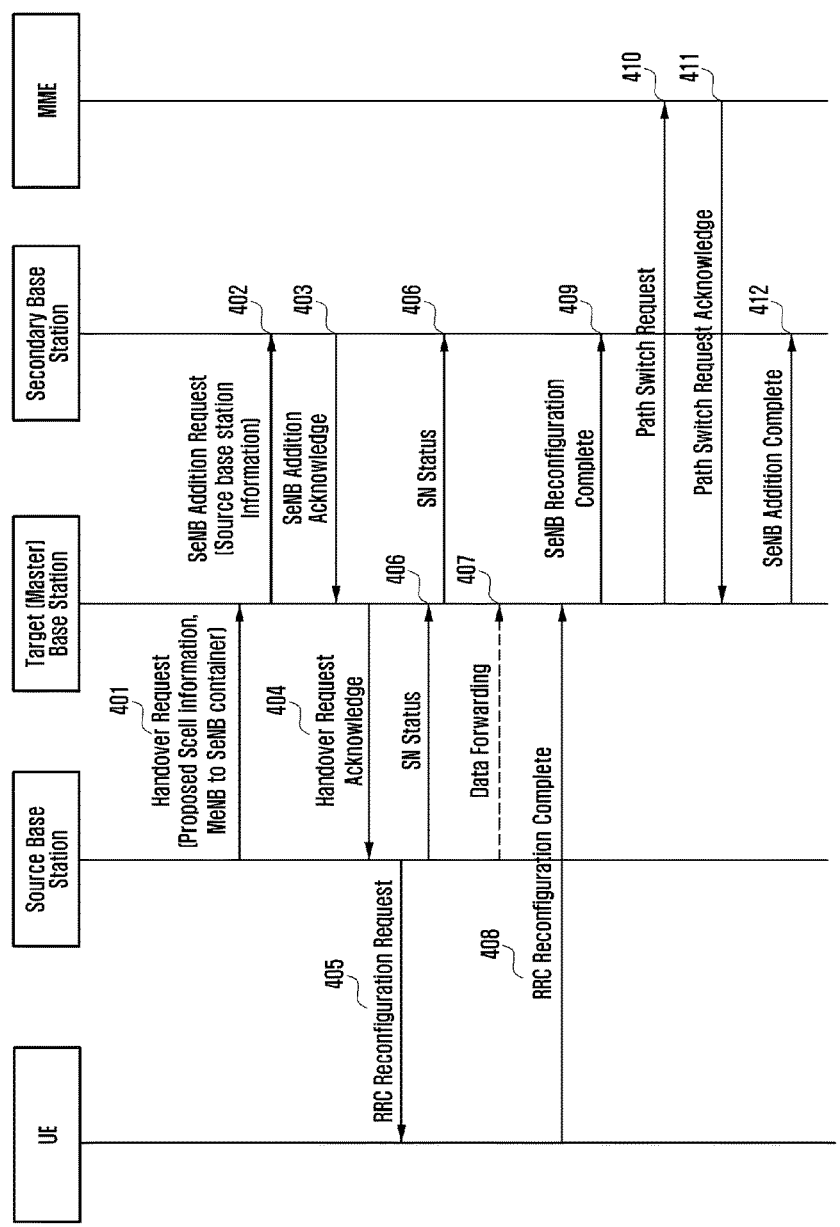
[Fig. 5]
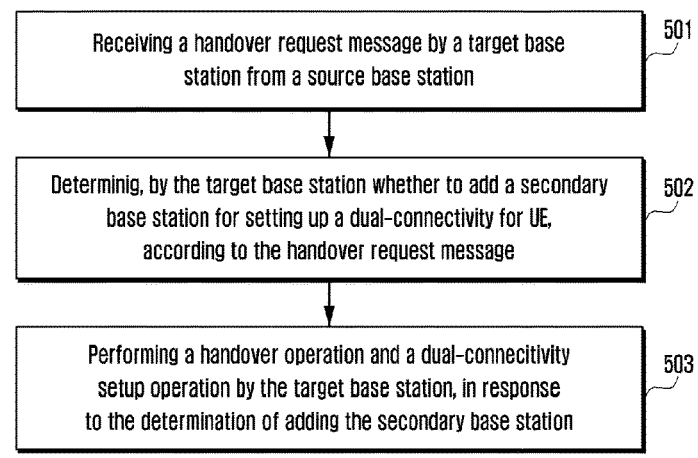

[Fig. 6]
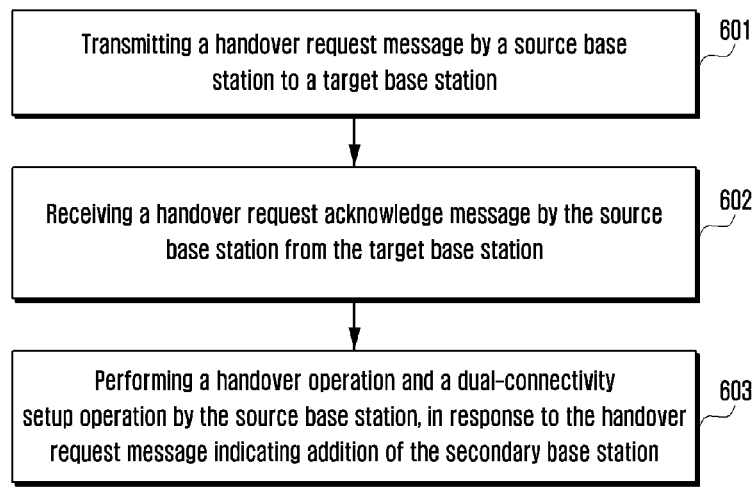
[Fig. 7]
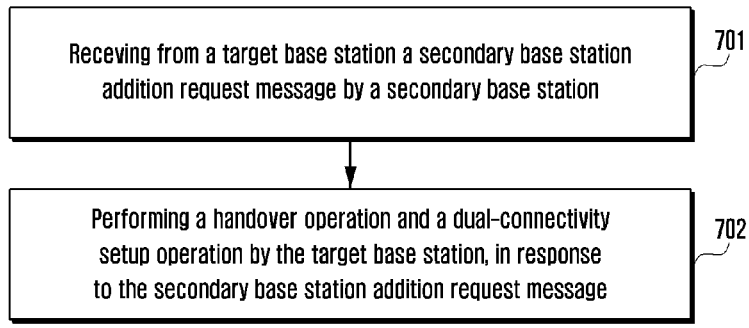

[Fig. 8]
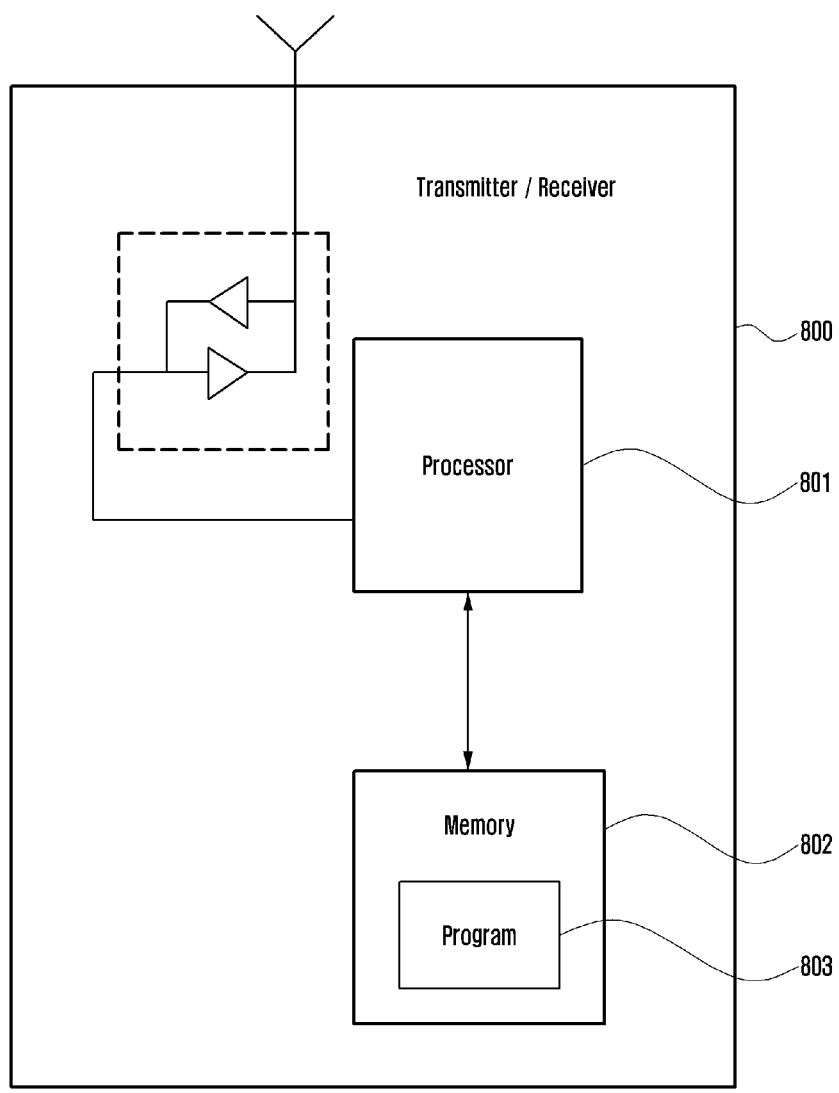

HANDOVER METHOD AND APPARATUS

CROSS-REFERENCE TO RELATED APPLICATIONS AND CLAIM OF PRIORITY

The present application claims priority under 35 U.S.C. § 365 to International Patent Application No. PCT/KR2016/000450 filed Jan. 15, 2016, entitled "HANDOVER METHOD AND APPARATUS", and through Chinese Patent Application No. 201510024425.0, which was filed on Jan. 16, 2015, both of which are incorporated herein by reference into the present disclosure as if fully set forth herein.

TECHNICAL FIELD

The present application relates a technical field of communication, particularly, to a technical field of wireless communication, more particularly, to handover methods and apparatuses.

BACKGROUND

Modern mobile communications tend to increasingly provide users with multimedia services with high-speed transmission. FIG. 1 illustrates a system architecture diagram of SAE (System Architecture Evolution). In FIG. 1, a UE (User Equipment) 101 is a terminal apparatus for receiving data. An E-UTRAN (Evolved UMTS Terrestrial Radio Access Network) 102 is a radio access network comprising a macro base station (enhanced Node B (eNodeB) or Node B) for providing the UE with interfaces to access to radio networks. An MME (Mobility Management Entity) 103 is responsible for managing mobile contexts, session contexts and security information of the UE. An SGW (Serving Gateway) 104 mainly provides a function of user plane, and the MME 103 and the SGW 104 may be located in the same physical entity. A PGW (Packet Data Network Gateway) 105 is responsible for functions such as billing, legally interception and etc. The PGW 105 and SGW 104 may also be located in the same physical entity. A PCRF (Policy charging and rules function) 106 provides QoS (Quality of Service) strategies and charging rules. An SGSN (Serving GPRS Support Node) 108 is a network node apparatus for providing data routing in a UMTS (Universal Mobile Telecommunications System). An HSS (Home Subscriber Server) 109 is a home ownership subsystem of the UE and is responsible for protecting user equipment information, such as current location of the user equipment, addresses of the service nodes, user equipment security information and packet data contexts of the user equipment.

In 3GPP release 12 (Rel-12), requirements for small cell enhancement are put forwarded, wherein objective scenarios of the small cell enhancement comprises scenarios with macro-cell coverage and without macro-cell coverage, enhancement for indoor and outdoor, ideal backhaul and non-ideal backhaul, as shown in FIG. 2. In FIG. 2, F1 and F2 correspond to different frequency points, respectively.

In the case of having macro-cell coverage, a technology for applying inter-NodeB CA (Carrier Aggregation) is provided. The macro cell and the small cell may work on different frequency bands. There are two types of architecture for applying the inter-NodeB CA technology: an architecture of user plane data being split based on RAN (Radio Access Network) and an architecture of user plane data being split based on CN (Core Network). In the architecture of user plane data being split based on CN, for a bearer set up on a pico cell (Pico cell), data is transmitted directly from the SGW of CN to the pico cell, and the user plane data cannot be forwarded through the macro cell.

In the architecture of small cell, the UE may transmit/receive data simultaneously from two base stations, which is referred to as a dual-connectivity. Only one of the two base stations is responsible for transmitting an RRC (Radio Resource Control) message to the UE and responsible for interactivity with the MME which is a control plane entity of the CN, and thus the base station is referred to as a master base station (Master eNB, MeNB), while the other is referred to as a secondary base station (Secondary eNB, SeNB). One cell in the master base station is a primary cell of the UE (Pcell), through which the RRC messages is transmitted to the UE; while the other cells are secondary cells (Scells). One cell of the UE among the Scells in the secondary base station is a primary cell of secondary base station (pScell). The pScell has an uplink physical layer control channel (UPCCH), whereas other Scell has no UPCCH. A cell group of the master base station is an MCG (Master Cell Group), and the cell group of the secondary base station is a SCG (Secondary Cell Group). Resources of the SCG of the UE are configured by the secondary base station, wherein the configuration for the UE is transmitted by the secondary base station to the master base station via an RRC container, and then transmitted by the master base station to the UE. The master base station does not parse the RRC container, or parse it without modifying the configurations of the RRC container.

SUMMARY

In the existing handover procedures, only single-connectivity is possible for a UE in a target base station. If channel qualities of multiple cells are in good conditions, the dual-connectivity cannot be used sufficiently to improve system capacities or provide the UE with high-speed data transmission rate. In order to utilize the benefit of dual-connectivity sufficiently, an SeNB addition procedure may be initiated by the target base station only after completion of the handover, which results in low efficiency.

The present application provides handover methods and apparatus to solve the aforementioned problems.

In a first aspect, the present application provides a handover method comprising: receiving a handover request message from a source base station by a target base station; determining whether to add a secondary base station for setting up a dual connectivity for a user equipment UE according to the handover request message; and performing a handover operation and a dual-connectivity setup operation in response to the determination of adding the secondary base station.

In some embodiments, the handover request message comprises a measurement result of the UE and/or quality of service (QoS) information of a bearer of the UE.

In some embodiments, the handover request message comprises information of a secondary cell or information of a secondary base station proposed by the source base station.

In some embodiments, the handover request message further comprises a RRC container from the target base station to the secondary base station.

In some embodiments, the step of determining whether to add a secondary base station comprises determining whether to add the secondary based on at least one of the following: a measurement result of the UE; quality of service (QoS) information of a bearer of the UE; capacity of a target primary cell of the target base station; and information of a secondary cell or information of a secondary base station proposed by the source base station.

In some embodiments, the step of performing a handover operation and a dual-connectivity operation comprises: transmitting, to the secondary base station, a secondary base station addition request message comprising information of the source base station; and receiving, from the secondary base station, a secondary base station addition request acknowledge message comprising an indication indicating whether it is feasible to directly forward data between the source base station and the secondary base station.

In some embodiments, the information of the source base station comprises an identifier of the source base station or a cell global identifier of a cell serving the UE in the source base station.

In some embodiments, the secondary base station addition request message further comprises at least one of aggregate maximum bit rate (AMBR) of the UE used in the secondary base station and a key of the UE used in the secondary base station.

In some embodiments, the step of performing the handover operation and the dual-connectivity operation further comprises:

determining a data forwarding mode between the source base station and the secondary base station, wherein the data forwarding mode comprises a direct data forwarding from the source base station to the secondary base station and an indirect data forwarding via the target base station; and transmitting, to the source base station, a handover request acknowledge message comprising information related to the data forwarding mode.

In some embodiments, the step of determining the data forwarding mode between the source base station and the secondary base station is performed according to at least one of the following: an indication indicating whether it is feasible to directly forward data; whether there is an X2 interface between the source base station and the secondary base station; and an operation and maintenance (O&M) configuration.

In some embodiments, the information related to the data forwarding mode comprises information related to the direct data forwarding or information related to the indirect data forwarding, and wherein the information related to the direct data forwarding comprises a tunnel endpoint identifier (TEID) and a transport layer address for data forwarding which are received from the secondary base station; and the information related to the indirect data forwarding comprises the TEID and the transport layer address for data forwarding which are allocated by the target base station.

In some embodiments, the handover request acknowledge message further comprises: a RRC container from the secondary base station to the target base station received from the secondary base station for use of performing an RRC reconfiguration by the UE.

In some embodiments, the step of performing the handover operation and the dual-connectivity setup operation comprises: transmitting a secondary base station reconfiguration complete message to the secondary base station, in response to receipt of an RRC reconfiguration complete message from the UE.

In some embodiments, the step of performing the handover operation and the dual-connectivity operation further comprises: transmitting a path switch request message to an MME connected with the target base station; and transmitting a secondary base station addition complete message to the secondary base station, in response to receipt of a path switch request acknowledge message from the MME.

In a second aspect, the present application provides a handover method comprising: transmitting a handover request message from a source base station to a target base station; receiving a handover request acknowledge message from the target base station; and performing a handover operation and a dual-connectivity operation, in response to the handover request acknowledge message indicating adding a secondary base station.

In some embodiments, the handover request message comprises information of a secondary cell or information of a secondary base station proposed by the source base station for use of determining whether to add the secondary base station by the target base station.

In some embodiments, the step of performing the handover operation and the dual-connectivity setup operation comprises: transmitting, to the UE, a radio resource control (RRC) reconfiguration request message comprising a RRC container from the secondary base station to the target base station from the secondary base station.

In some embodiments, the step of performing the handover operation and the dual-connectivity setup operation further comprises: transmitting a sequence number status message to the target base station.

In some embodiments, the handover request acknowledge message further comprises information related to data forwarding mode between the source base station and the secondary base station; and the step of performing the handover operation and the dual-connectivity setup operation further comprises: forwarding data between the source base station and the secondary base station according to the data forwarding mode and the information related to the data forwarding mode.

In a third aspect, the present application provides a handover method comprising: receiving a secondary base station addition request message by a secondary base station from a target base station, wherein the secondary base station addition request message is transmitted by the target base station when determining to add a secondary base station for setting up a dual-connectivity for a user equipment UE according to a handover request message transmitted to the target base station from the source base station; and performing a handover operation and a dual-connectivity setup operation, in response to the secondary base station addition request message.

In some embodiments, the secondary base station addition request message comprises information of the source base station. In some embodiments, the step of performing the handover operation and the dual-connectivity setup operation comprises: transmitting, to the target base station, a secondary base station addition request acknowledge message comprising an indication indicating whether it is feasible to directly forward data between the source base station and the secondary base station.

In a fourth aspect, the present application provides a target base station for handover comprising a receiver, a transmitter and a processor, wherein: the receiver is configured to receive a handover request message from a source base station; the processor is configured to determine whether to add a secondary base station for setting up a dual-connectivity for the UE; and the processor is further configured to control the transmitter and the receiver to perform a handover operation and a dual-connectivity setup operation if it is determined to add the secondary base station.

In a fifth aspect, the present application provides a source base station for handover comprising: a transmitter configured to transmit a handover request message to a target base station; a receiver configured to receive a handover request acknowledge message from the target base station; and a processor configured to control the transmitter and receiver to perform a handover operation and a dual-connectivity operation in response to the handover request acknowledge message indicating addition of a secondary base station.

In a sixth aspect, the present application provides a secondary base station for handover comprising a receiver, a transmitter and a processor, wherein: the receiver is configured to receive a secondary base station addition request message from a target base station, wherein the secondary base station addition request message is transmitted by the target base station in the case that it is determined that a secondary base station is to be added for setting up a dual-connectivity for a user equipment UE according to a handover request message transmitted to the target base station from the source base station; and the processor is configured to control the transmitter and the receiver to perform a handover operation and a dual-connectivity operation in response to the secondary base station addition request message.

According to the particular embodiments of technology described in the present application, the dual-connectivity set up during the handover is achieved by receiving the handover request message from the source base station via the target base station; and then determining whether to add the secondary base station for setting up the dual-connectivity for the UE according to the handover request message; and performing the handover operation and the dual-connectivity setup operation when it is determined to add the secondary base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

From the above technical solutions, different bearers of the UE may be switched simultaneously to different base stations by the method for setting up the dual-connectivity during the handover provided by the embodiments, so that the system capacity and the data transmission rate can be improved. In addition, the three problems mentioned above can be solved.

BRIEF DESCRIPTION OF THE DRAWINGS

Further features, objects and advantages of the present application will be more apparent with a review of a detailed description of the non-limiting embodiments set forth below with reference to the attached drawings.

FIG. 1 illustrates a system architecture diagram of a System Architecture Evolution (SAE) according to the prior art;

FIG. 2 illustrates a schematic diagram of objective scenario of a small cell enhancement according to the prior art;

FIG. 3 illustrates an example of signaling flow among a UE, a source base station, a target base station, a secondary base station and an MME according to embodiments of the present application;

FIG. 4 illustrates another example of signaling flow among a UE, a source base station, a target base station, a secondary base station and an MME according to embodiments of the present application;

FIG. 5 illustrates an exemplary flow chart of a method used for a target base station during a handover of a user equipment from a source base station to the target base station according to embodiments of the present application;

FIG. 6 illustrates an exemplary flow chart of a method for a source base station during a handover of a user equipment from the source base station to a target base station according to embodiments of the present application;

FIG. 7 illustrates an exemplary flow chart of a method for a secondary base station during a handover of a user equipment from a source base station to a target base station according to embodiments of the present application; and FIG. 8 illustrates a simplified block diagram of an entity of various exemplary embodiments adaptable to implement the present application.

DETAILED DESCRIPTION

Hereinafter, the embodiments of the present application will be further explained in detail with reference to the accompanying drawings. It should be understood that specific embodiments described herein are only intended to explain the relevant invention, rather than to limit the invention. In addition, it should be noted that only a portion related to the present invention is shown in the accompanying drawings for ease of description.

Provided that there is no conflict, it should be noted that the embodiments, and features in the embodiments of the present application may be combined. Hereinafter, the present application will be explained in detail with reference to the accompanying drawings in connectivity with the embodiments.

Hereinafter, a base station (BS) is an access apparatus for accessing a communication apparatus to a cellular network and is used to allocate communication resources to the communication apparatus. The base station may be any one entity of an enhanced Node B, a Node B, a radio access unit, a base station controller, a base transceiver station and etc. The communication apparatus may be any apparatus intended to access to services via access networks and may be configured to communicate through the access networks. For example, the communication apparatus may comprise, but not limit to, a user equipment (UE), a mobile station (MS), a cellular phone, a smart phone, a computer or a multimedia system with communication functions. It should be noted that terms "communication apparatus", "user equipment" and "user terminal" may be used interchangeably hereinafter.

Considering the problems described in the background portion, the present application provides solutions for handover and dual-connectivity setup processes for the UE to address at least one of the following problems: problem 1, how to determine to use dual-connectivity after the handover; problem 2, how to forward data when the dual-connectivity is used after the handover; and problem 3, how to support switching of a bearer's uplink transport layer address and tunnel identifier during the handover.

FIG. 3 illustrates an example of signaling flow among a UE, a source base station, a target base station, a secondary base station and an MME according to embodiments of the present application. The main procedures of the signaling flow comprise: the target base station decides whether to add the secondary base station and initiates corresponding procedures according to the determination result. It should be understood by the skilled in the art that one or more specific technical details are described in the following description for purposes of illustration and ease of understanding, but the embodiments of the present application may be implemented without these features. In the embodiment shown in FIG. 3, an example that the UE is switched from the source base station to the target base station and the dual-connectivity is set up with the target base station and the secondary base station is described.

As shown in FIG. 3, in step 301, the source base station decides to switch the UE to a target base station. The source base station transmits a handover request message to the target base station.

The aforementioned handover request message may comprise at least one of a measurement result of the UE and quality of service (QoS) information of a bearer of the UE.

Then, in step 302, the target base station decides whether to set up some bearers of the UE on the secondary base station.

The target base station decides whether to set up some bearers of the UE on the secondary base station according to the measurement result of the UE received from the source base station. Moreover, the target base station may also decide whether to set up some bearers of the UE on the secondary base station by considering the QoS information of the bearer and/or capacity of a target primary cell in the target base station, etc. If the target base station decides to set up some bearers of the UE on the secondary base station, the target base station may also be referred as the target master base station.

In the case that it is decided to set up some bearers of the UE on the secondary base station, the target master base station transmits an SeNB addition request message to the secondary base station, wherein the SeNB addition request message comprises information of the source base station. The information of the source base station may be an identifier of the source base station or a cell global identifier of a cell serving the UE in the source base station. The target master base station decides an aggregated maximum bit rate (Aggregated Maximum Bit Rate, AMBR) in the secondary base station and transmits the AMBR in the secondary base station to the secondary base station. For SCG bearer, the target master base station transmits a key (Key) for the UE in secondary base station to the secondary base station.

After the SeNB addition request message is received, in step 303, the secondary base station transmits the SeNB addition request acknowledge message to the target master base station.

The secondary base station may decide whether it is feasible to forward data directly between the source base station and the secondary base station according to the received information of the source base station. If yes, the secondary base station transmits a direct data forwarding feasible indication to the target master base station. The secondary base station decides whether the direct data forwarding is feasible according to the existence of an X2 interface between the source base station and secondary base station. The secondary base station may also decide whether it is feasible to forward data directly by considering other factors such as the O&M configuration, which will not limit the present application. In one implementation, the secondary base station may transmit an indication indicating whether it is feasible to forward data directly to the target master base station through the SeNB addition request acknowledge message. In one implementation, the SeNB addition request acknowledge message further comprises a RRC container from the secondary base station to the master base station.

Then, in step 304, the target master base station transmits a handover request acknowledge message to the source base station.

The target master base station decides a data forwarding mode of the bearer set up on the secondary base station between the source base station and the secondary base station, wherein the data forwarding mode comprises a direct data forwarding from the source base station to the secondary base station and an indirect data forwarding via the target master base station. For the indirect data forwarding, data is forwarded from the source base station to the target master base station, and then to the secondary base station.

In some embodiments, the target master base station may determine the data forwarding mode between the source base station and the secondary base station according to at least one of an indication indicating whether it is feasible to forward data directly; an existence of an X2 interface between the source base station and the secondary base station; and an O&M (Operation & Maintenance) configuration. For example, if the aforementioned indication indicates that the direct data forwarding is feasible, the target master base station may decide performing the direct data forwarding; otherwise, the target master base station may decide to use the indirect data forwarding via the target master base station. The target master base station may also decide the data forwarding mode by considering other factors, which will not limit the present application. In one implementation, if the target master base station determines the data forwarding mode is the direct data forwarding, the target master base station may transmit a TEID (Tunnel Endpoint Identifier) and a transport layer address for data forwarding which are received from the secondary base station to the source base station through the handover request acknowledge message. However, if the target master base station determines the data forwarding mode is the indirect data forwarding, the target master base station may allocate and transmit the TEID and the transport layer address for data forwarding to the source base station through the handover request acknowledge message.

In one implementation, the target master base station may also transmit the RRC container from the secondary base station to the master base station received from the secondary base station, to the source base station through the handover request acknowledge message.

After the handover request acknowledge message is received, in step 305, the source base station transmits an RRC reconfiguration request message to the UE.

The RRC reconfiguration message comprises the RRC configuration information received from the target base station by the source base station, i.e., comprising the RRC container from the secondary base station to the master base station which is received from the secondary base station.

Then, in step 306, the source base station transmits a SN (Sequence Number) status to the target master base station.

The target master base station then transmits the SN status to the secondary base station.

Then, in step 307, the source base station starts data forwarding. The source base station forwards data according to the TEID and transport layer address for data forwarding received from the target base station.

After the RRC reconfiguration request message is received, in step 308, the UE transmits an RRC reconfiguration complete message to the target master base station.

After that, in step 309, the target master base station transmits the SeNB reconfiguration complete message to the secondary base station. Then, in step 310, the target master base station transmits a path switch request message to the MME.

Responding to step 310, in step 311, the MME transmits a path switch request acknowledge message to the target master base station.

Then, in step 312, the target master base station transmits the SeNB addition complete message to the secondary base station.

For SCG bearer, the target master base station transmits an uplink switched bearer list to the secondary base station. The information of the uplink switched bearer comprises the E-UTRAN radio access bearer ID E-RAB ID, the transport layer address and the TEID. In one implementation, the aforementioned SeNB addition complete message may be an existing message (such as the SeNB reconfiguration complete message), which comprises the uplink switched bearer list. In another implementation, the aforementioned SeNB addition complete message may also be a new message.

Alternatively, if the SCG bear did not switch in the uplink or the bearer set up on the SeNB is a split bearer, step 312 may not be performed.

In the example of the signaling flow shown in FIG. 3, whether to configure the SeNB is determined by the target base station, so that the dual-connectivity is set up during the handover, and thus QoS requirements of the user equipment after the handover can be satisfied, the air interface throughput can be improved and the three aforementioned problems of setting up dual-connectivity during the handover can be solved.

FIG. 4 illustrates another example of the signaling flows among a UE, a source base station, a target base station, a secondary base station and an MME according to embodiments of the present application. The signaling flows in FIG. 4 differ from that in FIG. 3 mainly in that: in FIG. 4, a secondary cell Scell or the secondary base station is proposed by the source base station and the proposed result is transmitted to the target master base station. The source base station decides the proposed Scell or secondary base station according to the measurement result of the UE and/or the QoS requirements of bearer and/or the capacity of the target primary cell and etc. In the embodiment of FIG. 4, an example in which the UE is switched from the source base station to the target base station and a dual-connectivity is set up with the target base station and the secondary base station.

As shown in FIG. 4, in step 401, the source base station decides to switch the UE to the target base station. The source base station transmits a handover request message to the target base station.

In some embodiments, the source base station proposes the secondary cell or the secondary base station and transmits the information of the proposed secondary cell or the secondary base station to the target master base station through the handover request message. The source base station decides the proposed Scell or the secondary base station according to the measurement result of the UE and/or the QoS requirements of the bearer, and/or the capacity of the target primary cell and etc. The source base station transmits the handover request message to the target master base station. The aforementioned handover request message comprises information of the Scell or the secondary base station proposed by the source base station. The Scell information proposed by the source base station comprises the ECGI of the Scell, and may also comprise a base station identifier of the base station to which the Scell belongs. The aforementioned handover request message may comprise a container from the master base station to the secondary base station. The container from the master base station to secondary base station comprises configuration information of the UE in the Scell. The source base station may propose multiple secondary cells, corresponding to multiple Scell, and the container from the MeNB to the SeNB comprises configuration information of the UE in the multiple Scells.

Then, in step 402, the target master base station decides to set up a dual-connectivity.

In some embodiments, the target master base station may set up the dual-connectivity according to the proposal of the source base station. The target master base station transmits the SeNB addition request message to the secondary base station. The step 402 is performed only when it is decided by the target base station to set up some bearers on the secondary base station. The aforementioned SeNB addition request message comprises information of the source base station. The information of the source base station may be an identifier of the source base station or a cell global identifier of a cell serving the UE in the source base station. The target master base station decides the AMBR in the secondary base station and transmits it to the secondary base station. For SCG bearer, the target master base station transmits a key (Key) in the secondary base station to the secondary base station.

The processes from step 403 to step 412 are the same as that from step 303 to step 312, and thus the repeated description thereof will be omitted here.

In the example of the signaling flow shown in FIG. 4, the target base station decides whether to configure the SeNB through the source base station suggesting the secondary cell or the secondary base station, so that the dual-connectivity is set up during the handover, and thus QoS requirements of the user equipment after the handover can be satisfied, the air interface throughput can be improved and the three aforementioned problems of setting up dual-connectivity during the handover can be solved.

FIG. 5 illustrates an exemplary flow chart of a method for the target base station during the handover of the user equipment from the source base station to the target base station according to the embodiments of the present application. Referring again to FIG. 3 and FIG. 4, the method shown in FIG. 5 may be performed when the handover request message transmitted from the source base station is received by the target base station.

As shown in FIG. 5, in step 501, the target base station receives the handover request message from the source base station.

In some embodiments, the aforementioned handover request message comprises the measurement result of the UE and/or the quality of service (QoS) information of bearer of the UE.

In some embodiments, the handover request message comprises information of the secondary cell or the secondary base station proposed by the source base station, wherein the information of the secondary cell or the secondary base station is determined based on at least one of the measurement result of the UE, the QoS information of bearer of the UE and the capacity of the target primary cell of the target base station.

Alternatively, the handover request message further comprises a RRC container from the target base station to the secondary base station.

Next, in step 502, the target base station determines whether to add a secondary base station for setting up a dual-connectivity for the UE according to the handover request message.

In some embodiments, the target base station determines whether to add the secondary base station based on at least one of the measurement result of the UE, the QoS information of bearer of the UE and the capacity of the target primary cell of the target base station.

In some embodiments, if the handover request message in step 501 comprises the information of the secondary cell or the secondary base station proposed by the source base station, the target base station may determine whether to add the secondary base station based on at least one of the measurement result of the UE, the QoS information of bearer of the UE, the capacity of the target primary cell of the target base station, and the aforementioned information of the secondary cell or the secondary base station.

Finally, in step 503, the target base station performs the handover operation and the dual-connectivity setup operation in response to the determination of adding of the secondary base station.

In some embodiments, the step of performing the handover operation and the dual-connectivity setup operation comprises: transmitting, to the secondary base station, a secondary base station addition request message comprising the above information of the source base station; receiving, from the secondary base station, a secondary base station addition request acknowledge message comprising an indication indicating whether it is feasible to forward data directly between the source base station and the target base station, wherein the indication is generated by the secondary base station according to the aforementioned information of the source base station.

Here, the information of the source base station may comprise the identifier of the source base station or the cell global identifier of a cell serving the UE in the source base station. The aforementioned secondary base station addition request message may further comprise at least one of the AMBR of the UE used in the secondary base station and the key (Key) of the UE used in secondary base station.

In some embodiments, the step of performing the handover operation and the dual-connectivity setup operation may further comprise: determining by the target base station the data forwarding mode between the source base station and the secondary base station, wherein the data forwarding mode comprises a direct data forwarding from the source base station to the secondary base station and an indirect data forwarding via the target base station; and transmitting a handover request acknowledge message to the source base station, wherein the handover request acknowledge message comprises information related to the data forwarding mode. In one implementation, the aforementioned handover request acknowledge message further comprises the RRC container from the secondary base station to the target base station received from the secondary base station for performing the RRC reconfiguration by the UE.

Here, the information related to the data forwarding mode comprises information related to the direct data forwarding and information related to the indirect data forwarding, wherein the information related to the direct data forwarding comprises a tunnel endpoint identifier (TEID) and a transport layer address for data forwarding which are received from the secondary base station, and the information related to the indirect data forwarding comprises the TEID and the transport layer address for data forwarding which are allocated by the target base station.

In one implementation, the target base station determines the data forwarding mode between the source base station and the secondary base station according to at least one of an indication indicating whether it is feasible to forward data directly, an existence of an X2 interface between the source base station and the secondary base station and an operation and maintenance (O&M) configuration.

In some embodiments, the step of performing the handover operation and the dual-connectivity setup operation may further comprise: transmitting a serial number status message from the target base station to the secondary base station, in response to receipt of a serial number status message from the source base station; and transmitting an RRC reconfiguration complete message from the target base station to the secondary base station in response to receipt of an RRC reconfiguration complete message from the UE.

In some embodiments, the step of performing the handover operation and the dual-connectivity setup operation may further comprise: transmitting a path switch request message from the target base station to an MME connected with the target base station; and transmitting a secondary base station addition complete message to the secondary base station, in response to receipt of a path switch request acknowledge message from the MME.

FIG. 6 illustrates an exemplary flow chart of a method for the source base station during handover of the user equipment from the source base station to the target base station according to the embodiments of the present application. Referring again to FIG. 3 and FIG. 4, the method shown in FIG. 6 may be performed when a handover request message is transmitted from the source base station to the target base station.

As shown in FIG. 6, in step 601, the source base station transmits a handover request message to the target base station.

In some embodiments, the aforementioned handover request message comprises information of the secondary cell or the secondary base station proposed by the source base station for use of determining whether to add the secondary base station by the target base station, wherein the information of secondary cell or the secondary base station is determined by the source base station based on at least one of a measurement result of the UE, a QoS information of bearer of the UE and a capacity of the target primary cell of the target base station.

Next, in step 602, a handover request acknowledge message is received by the source base station from the target base station.

In some embodiments, the handover request acknowledge message may comprise information related to the data forwarding mode between the source base station and the secondary base station.

Finally, in step 603, the source base station performs a handover operation and a dual-connectivity setup operation, in response to the handover request acknowledge message indicating adding the secondary base station.

In some embodiments, the aforementioned step of performing the handover operation and the dual-connectivity setup operation comprises: transmitting an RRC reconfiguration request message from the source base station transmits to the UE, wherein the aforementioned RRC reconfiguration request message comprises the RRC container from the secondary base station to the target base station which is received from the secondary base station.

In some embodiments, the aforementioned step of performing the handover operation and the dual-connectivity setup operation further comprises: forwarding data by the source base station between the source base station and the target base station according to the data forwarding mode and the information related to the data forwarding mode received in step 602.

FIG. 7 illustrates an exemplary flow chart of a method for the secondary base station during handover of the UE from the source base station to the target base station according to embodiments of the present application. Referring again to FIG. 3 and FIG. 4, the method shown in FIG. 7 may be performed when secondary base station addition request message is received by the secondary base station from the target base station.

As shown in FIG. 7, in step 701, the secondary base station receives the secondary base station addition request message from the target base station.

In some embodiments, the aforementioned secondary base station addition request message comprises information of the source base station regarding to transmitting the handover request information to the target base station, wherein the secondary base station addition request message is transmitted by the target base station when determining to add a secondary base station for setting up a dual-connectivity for the user equipment UE according to the aforementioned handover request message.

Next, in step 702, the secondary base station performs the handover operation and the dual-connectivity operation in response to the secondary base station addition request message.

In some embodiments, the aforementioned step of performing the handover operation and the dual-connectivity operation comprises: transmitting a secondary base station addition request acknowledge message from the secondary base station to the target base station, wherein the secondary base station addition request acknowledge message comprises an indication indicating whether it is feasible to forward data directly between the source base station and the secondary base station which is generated by the secondary base station according to information of the source base station.

FIG. 8 illustrates a simplified block diagram of an entity 800 of various exemplary embodiments adaptable to practice the present application. The entity 800 may be configured to be a source base station, a target base station or a secondary base station.

As shown in FIG. 8, the entity 800 comprises a processor 801, a memory 802 coupled to the processor 801 and a suitable RF transmitter/receiver 804 coupled to the processor 801. The memory 802 stores programs 803. The transmitter/receiver 804 is suitable for two-way communication. It should be noted that the transmitter/receiver 804 has at least one antenna for assisting the communication. The entity 800 may be coupled to one or more external networks or systems, such as MME, via data paths.

The program 803 may comprise program commands. When the program commands are executed by associated processor 801, the entity 800 may operate according to the respective exemplary embodiments of the present application.

The embodiments of the present application may be implemented by computer software which could be executed by the processor 801 of the entity 800, or hardware, or the combination of software and hardware.

The memory 802 may be any appropriate type of memory suitable for local technical environment, and may be achieved by any appropriate data-storage technology, for example, a memory device and system based on semiconductor, a magnetic memory device and system, an optical memory device and system, a fixed memory and a removable memory, which are only some non-restrictive examples. Although only one memory is illustrated in the entity 800, a plurality of physically independent memory units may be contained by the entity 800. The processor 801 may be any appropriate type of processor suitable for local technical environment, and may comprise one or more of the followings: a general-purpose computer, a special-purpose computer, a microprocessor, a digital signal processor (DSP) and a processor based on multi-core architecture, which are only some non-restrictive examples.

When the entity 800 is configured as a target base station, in some embodiments, the receiver of the transmitter/receiver 804 is configured to receive a handover request message from a source base station. The processor 801 is configured to determine whether to add a secondary base station for setting up dual-connectivity for the UE according to the aforementioned handover request message. The processor 801 is further configured to control the transmitter/receiver 804 to perform a handover operation and a dual-connectivity setup operation when determining to add a secondary base station.

When the entity 800 is configure as a source base station, in some embodiments, the transmitter of the transmitter/receiver 804 is configured to transmit a handover request message to the target base station; the receiver of the transmitter/receiver 804 is configured to receive a handover request acknowledge message from the target base station; and the processor 801 is configured to control the transmitter/receiver 804 to perform a handover operation and a dual-connectivity setup operation in response to the handover request acknowledge message indicating adding the secondary base station.

When the entity 800 is configured as a secondary base station, in some embodiments, the receiver of the transmitter/receiver 804 is configured to receive the secondary base station addition request message from the target base station, wherein the secondary base station addition request message is transmitted by the target base station when determining to add a secondary base station for setting up a dual-connectivity for a user equipment UE according to the handover request message transmitted to the target base station from the source base station. The processor 801 is configured to control the aforementioned transmitter and receiver to perform the handover operation and the dual-connectivity setup operation in response to the secondary base station addition request message.

It should be comprehended that, each unit comprised in the entity 800 is configured to implement the exemplary embodiments disclosed in the present application. Therefore, the above operations and feathers described by combining FIG. 3 to FIG. 7 are also applicable to the entity 800 and the units therein, and a detailed description thereof will be omitted herein.

In addition, there is provided a computer readable storage medium, which may be the computer readable storage medium contained in the source base station, the target base station or the secondary base station in the above embodiments, or a computer readable storage medium individually exists rather than being fitted into any apparatus. There is one or more computer programs stored on the computer readable storage medium, and one or more processors run the one or more computer programs to perform the method for overload processing mentioned in the present application.

From the above technical solutions, different bearers of the UE may be switched simultaneously to different base stations by the method for setting up the dual-connectivity during the handover provided by the embodiments, so that the system capacity and the data transmission rate can be improved. In addition, the three problems mentioned above can be solved.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

The invention claimed is:

1. A method for configuring a dual-connectivity for a user equipment (UE) during a handover procedure by a target base station, the method comprising:
   receiving, from a source base station, a handover request message;
   transmitting, to a secondary base station, a secondary base station addition request message;
   receiving, from the secondary base station, a secondary base station addition request acknowledge message including information on a forwarding address related to the secondary base station; and
   transmitting, from the target base station to the source base station, a handover request acknowledge message including the information on the forwarding address related to the secondary base station for data forwarding of the source base station.

2. The method according to claim 1, wherein the handover request message includes at least one of configuration information on the secondary base station, a measurement result of the UE, and quality of service (QoS) information of a bearer of the UE.

3. The method according to claim 1, wherein the handover request acknowledge message includes a radio resource control (RRC) container to be sent to the UE.

4. The method according to claim 1, wherein the determining whether to add a secondary base station comprises determining whether to add the secondary base station based on at least one of the following:
   a measurement result of the UE;
   quality of service (QoS) information of a bearer of the UE;
   a capacity of a target primary cell in the target base station; or
   information of a secondary cell or information of the secondary base station proposed by the source base station.

5. The method according to claim 1, the method further comprising:
   determining a data forwarding mode between the source base station and the secondary base station, wherein the data forwarding mode includes a direct data forwarding from the source base station to the secondary base station and an indirect data forwarding via the target base station.

6. The method according to claim 5, wherein the step of determining the data forwarding mode between the source base station and the secondary base station is performed according to at least one of the following:
   an indication indicating whether it is feasible to directly forward data;
   an existence of an X2 interface between the source base station and the secondary base station; and
   an operation and maintenance (O&M) configuration.

7. The method according to claim 5, wherein the handover request acknowledge message includes information related to the data forwarding mode, and wherein the information related to the data forwarding mode includes information related to the direct data forwarding or information related to the indirect data forwarding, and
   wherein the information related to the direct data forwarding includes a tunnel endpoint identifier (TED) for data forwarding which are received from the secondary base station and the information related to the indirect data forwarding includes the TED and for data forwarding which are allocated by the target base station.

8. The method according to claim 1, the method further comprising:
   transmitting a secondary base station reconfiguration complete message to the secondary base station, in response to receipt of an RRC reconfiguration complete message from the UE.

9. The method according to claim 1, the method further comprising:
   transmitting a path switch request message to an MME connected with the target base station; and
   receiving a path switch request acknowledge message corresponding to the path switch request message from the MME.

10. The method of claim 1, further comprising:
    determining whether to add the secondary base station for setting up the dual-connectivity for the UE based on the handover request message.

11. A method for configuring a dual-connectivity for a user equipment (UE) during a handover procedure by a source base station, the method comprising:
    transmitting, to a target base station, a handover request message; and
    receiving, from the target base station at the source base station, a handover request acknowledge message including information on a forwarding address related to a secondary base station for data forwarding of the source base station in response to a determination to add the secondary base station,
    wherein the information on the forwarding address related to the secondary base station included in the handover request acknowledge message is identified based on a secondary base station addition request acknowledge message received at the target base station, and
    wherein secondary base station addition request acknowledge message includes the information on the forwarding address related to the secondary base station.

12. The method according to claim 11, the method further comprising:
    transmitting, to the UE, a radio resource control (RRC) reconfiguration request message for triggering the UE to apply a new configuration.

13. The method according to claim 12, the method further comprising:

transmitting a sequence number status message to the target base station.

14. The method according to claim 13, the method further comprising:
forwarding data between the source base station and the secondary base station according to a data forwarding mode and information related to the data forwarding mode,
wherein the handover request acknowledge message includes the information related to the data forwarding mode between the source base station and the secondary base station.

15. A method for configuring a dual-connectivity for a user equipment (UE) during a handover procedure by a secondary base station, the method comprising:
receiving, from a target base station, a secondary base station addition request message; and
transmitting, to the target base station, a secondary base station addition request acknowledge message including information on a forwarding address related to the secondary base station for data forwarding of a source base station in response to the secondary base station addition request message,
wherein a handover request message is transmitted from the source base station to the target base station, and
wherein a handover request acknowledge message from the target base station to the source base station includes the information on the forwarding address.

16. The method according to claim 15, wherein the secondary base station addition request message includes information of the source base station.

17. A target base station for configuring a dual-connectivity for a user equipment (UE) during a handover procedure, the target base station comprising:
a transceiver; and
a processor coupled with the transceiver and configured to control to:
receive, from a source base station, a handover request message,
transmit, to a secondary base station, a secondary base station addition request message,
receive, from the secondary base station, a secondary base station addition request acknowledge message including information on a forwarding address related to the secondary base station, and
transmit, to the source base station, a handover request acknowledge message including the information on the forwarding address related to the secondary base station for data forwarding of the source base station.

18. A source base station for configuring a dual-connectivity for a user equipment (UE) during a handover procedure, the source base station comprising:
a transceiver; and
a processor coupled with the transceiver and configured to control to:
transmit, to a target base station, a handover request message,
receive, from the target base station, a handover request acknowledge message including information on forwarding address related to a secondary base station for data forwarding of the source base station in response to a determination to add the secondary base station, and
perform a handover operation and a dual-connectivity operation in response to the handover request acknowledge message,
wherein the information on the forwarding address related to the secondary base station included in the handover request acknowledge message is identified based on a secondary base station addition request acknowledge message received at the target base station, and
wherein secondary base station addition request acknowledge message includes the information on the forwarding address related to the secondary base station.

19. A secondary base station for configuring a dual-connectivity for a user equipment during a handover procedure, the secondary base station comprising:
a transceiver; and
a processor coupled with the transceiver and configured to control to:
receive, from a target base station, a secondary base station addition request message, and
transmit, to the target base station, a secondary base station addition request acknowledge message including information on a forwarding address related to the secondary base station for data forwarding of a source base station in response to the secondary base station addition request message,
wherein a handover request message is transmitted from the source base station to the target base station, and
wherein a handover request acknowledge message from the target base station to the source base station includes the information on the forwarding address.

* * * * *